United States Patent
Dong et al.

(10) Patent No.: US 11,100,399 B2
(45) Date of Patent: Aug. 24, 2021

(54) FEATURE EXTRACTION USING MULTI-TASK LEARNING

(71) Applicant: INTERNATIONAL BUSINESS MACHINES CORPORATION, Armonk, NY (US)

(72) Inventors: Wei Shan Dong, Beijing (CN); Peng Gao, Beijing (CN); Chang Sheng Li, Beijing (CN); Chun Yang Ma, Beijing (CN); Kai AD Yang, Beijing (CN); Ren Jie Yao, Beijing (CN); Ting Yuan, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 947 days.

(21) Appl. No.: 15/818,877

(22) Filed: Nov. 21, 2017

(65) Prior Publication Data

US 2019/0156211 A1    May 23, 2019

(51) Int. Cl.
*G06N 3/08* (2006.01)
*G06N 3/04* (2006.01)

(52) U.S. Cl.
CPC ............ *G06N 3/084* (2013.01); *G06N 3/04* (2013.01)

(58) Field of Classification Search
CPC ................................ G06N 3/04; G06N 3/084
See application file for complete search history.

(56) References Cited

U.S. PATENT DOCUMENTS

| 8,554,468 | B1 | 10/2013 | Bullock |
| 9,053,591 | B2 | 6/2015 | Phelan et al. |
| 9,081,650 | B1 | 7/2015 | Brinkmann et al. |
| 9,141,916 | B1 | 9/2015 | Corrado et al. |

(Continued)

FOREIGN PATENT DOCUMENTS

| CN | 111247532 A | 6/2020 |
| DE | 112018005227 T5 | 7/2020 |

(Continued)

OTHER PUBLICATIONS

Ruder, Sebastian. "An overview of multi-task learning in deep neural networks." arXiv preprint arXiv:1706.05098 (Jun. 15, 2017). (Year: 2017).*

(Continued)

*Primary Examiner* — Alan Chen
*Assistant Examiner* — Jeremy Scott Cooper
(74) *Attorney, Agent, or Firm* — Elliot J. Shine (57) ABSTRACT

Systems and methods for training a neural network model are disclosed. In the method, training data is obtained by a deep neural network (DNN) first, the deep neural network comprising at least one hidden layer. Then features of the training data are obtained from a specified hidden layer of the at least one hidden layer, the specified hidden layer being connected respectively to a supervised classification network for classification tasks and an autoencoder based reconstruction network for reconstruction tasks. And at last the DNN, the supervised classification network and the reconstruction network are trained as a whole based on the (Continued)

obtained features, the training being guided by the classification tasks and the reconstruction tasks.

21 Claims, 8 Drawing Sheets

(56) References Cited

U.S. PATENT DOCUMENTS

| | | | |
|---|---|---|---|
| 9,315,195 B2 | 4/2016 | Armitage et al. | |
| 9,508,347 B2* | 11/2016 | Wang | G10L 15/063 |
| 10,614,361 B2* | 4/2020 | Chung | G06N 3/0454 |
| 2009/0024419 A1 | 1/2009 | McClellan et al. | |
| 2013/0212052 A1 | 8/2013 | Yu et al. | |
| 2017/0068888 A1 | 3/2017 | Chung et al. | |
| 2017/0323202 A1 | 11/2017 | Wang et al. | |
| 2017/0337464 A1* | 11/2017 | Rabinowitz | G06N 3/0454 |

FOREIGN PATENT DOCUMENTS

| | | |
|---|---|---|
| GB | 2580855 A | 7/2020 |
| WO | 2013023061 A1 | 2/2013 |
| WO | 2019100784 A1 | 5/2019 |

OTHER PUBLICATIONS

Bojarski, Mariusz, et al. "End to end learning for self-driving cars." arXiv preprint arXiv: 1604.07316 (Apr. 25, 2016). (Year: 2016).*

Makhzani, Alireza, et al. "Adversarial autoencoders." arXiv preprint arXiv: 1511.05644 (Nov. 18, 2015). (Year: 2015).*

Zhang, Yan, Erhu Zhang, and Wanjun Chen. "Deep neural network for halftone image classification based on sparse auto-encoder." Engineering Applications of Artificial Intelligence 50 (Apr. 1, 2016): 245-255. (Year: 2016).*

Zhuang, Fuzhen, et al. "Representation learning via semi-supervised autoencoder for multi-task learning." 2015 IEEE International Conference on Data Mining. IEEE, Nov. 14, 2015. (Year: 2015).*

Caruana, Rich, and Joseph O'Sullivan. "Multitask Pattern Recognition for Vision-Based Autonomous Robots." International Conference on Artificial Neural Networks. Springer, London, Sep. 2, 1998. (Year: 2015).*

Hendrycks, Dan, and Kevin Gimpel. "A baseline for detecting misclassified and out-of-distribution examples in neural networks." arXiv preprint arXiv:1610.02136 (Oct. 7, 2016). (Year: 2016).*

Lin et al., "An Overview on Study of Identification of Driver Behavior Characteristics for Automotive Control," Hindawi Publishing Corporation, Mathematical Problems in Engineering, vol. 2014, Published Mar. 17, 2014, Article ID 569109, pp. 1-16.

Li Z. et al., "Unsupervised Detection of Driver's Behavior Patterns", Australasian Transport Research Forum (ATRF), 37th (10 pages) (2015).

Mell P., et al., "The NIST Definition of Cloud Computing", NIST Special Publication 800-145, National Institute of Standards and Technology, U.S. Department of Commerce, pp. 1-7 (Sep. 2011).

International Search Report and Written Opinion of the International Searching Authority for International Application No. PCT/CN2018/102161, International Filing Date: Aug. 24, 2018, dated Nov. 29, 2018, 9 pages.

Dong et al., Application No. CN2018/102161, filed on Aug. 24, 2018, entitled: "Feature Extraction Using Multi-Task Learning", 38 pages.

Dong, et al., "Feature Extraction Using Multi-Task Learning," Application and Drawings, Filed on Aug. 24, 2018, 63 Pages, Related JP Patent Application Serial No. 2020-527878.

* cited by examiner

FEATURE EXTRACTION USING MULTI-TASK LEARNING

The present application relates generally to data processing, and more particularly to a computer-implemented method, system and computer program product to extract features using multi-task learning.

BACKGROUND

In modern days, Artificial Intelligence (AI) is widely used for processing data. In the scenario of Big Data, features of the data are typically extracted to reduce redundancy, which are typically represented as feature vectors. The features to be extracted are expected to contain relevant information of the data so that, a desired task, for example a classification task or a clustering task, can be performed by using this reduced representation instead of the complete data.

Feature extraction may be valuable in various technical areas, for example, analyzing GPS and other vehicle sensor data is critical in telematics and connected vehicle solutions. The determination that who is driving a car and how he drives is useful for analysis and recordation for later use. For example, a key requirement raised from auto insurance companies is about modeling human drivers' driving style for driver identification, and thus the identification result may be very useful in the Usage-Based Insurance (UBI), which is a new rising auto insurance whereby the costs are dependent upon type of vehicle used, measured against time, distance, driving behavior and place. The problem behind the requirement is how to obtain a good feature representation that can be used to distinguish different drivers according to driving behavior of the drivers.

Typical models used to rely on handcrafted features from raw data, with a heavy reliance on human domain knowledge and experience. This reliance on human domain knowledge and experience is not always reliable and typically not always complete.

In addition, existing methods mainly use a classification framework to learn the feature representations. However, in practice, it is hard to collect sufficient training data with labels for any new data, which makes existing methods do not work well on the new data.

BRIEF SUMMARY

According to one embodiment, there is provided a computer implemented method for training a neural network. According to the method, training data may be obtained by a deep neural network (DNN), the deep neural network comprising at least one hidden layer first. Then features of the training data may be obtained from a specified hidden layer of the at least one hidden layer, the specified hidden layer being connected respectively to a supervised classification network for classification tasks and an autoencoder based reconstruction network for reconstruction tasks. And at last the DNN, the supervised classification network and the reconstruction network may be trained as a whole based on the obtained features, the training being guided by the classification tasks and the reconstruction tasks.

According to another embodiment of the present invention, there is provided a computer system for training a neural network. The computer system comprises a processor and a computer-readable memory coupled to the processor. The memory comprises instructions executable by the processor. The processor operable to perform one or more following actions. First, training data may be obtained by a deep neural network (DNN), the deep neural network comprising at least one hidden layer. Then features of the training data may be obtained from a specified hidden layer of the at least one hidden layer, the specified hidden layer being connected respectively to a supervised classification network for classification tasks and an autoencoder based reconstruction network for reconstruction tasks. And at last the DNN, the supervised classification network and the reconstruction network may be trained as a whole based on the obtained features, the training being guided by the classification tasks and the reconstruction tasks.

According to still another embodiment of the present invention, there is provided a computer program product. The computer program product comprises a computer readable storage medium having program instructions embodied therewith, the program instructions executable by a processor to cause the processor to perform one or more following actions. First, training data may be obtained by a deep neural network (DNN), the deep neural network comprising at least one hidden layer. Then features of the training data may be obtained from a specified hidden layer of the at least one hidden layer, the specified hidden layer being connected respectively to a supervised classification network for classification tasks and an autoencoder based reconstruction network for reconstruction tasks. And at last the DNN, the supervised classification network and the reconstruction network may be trained as a whole based on the obtained features, the training being guided by the classification tasks and the reconstruction tasks.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
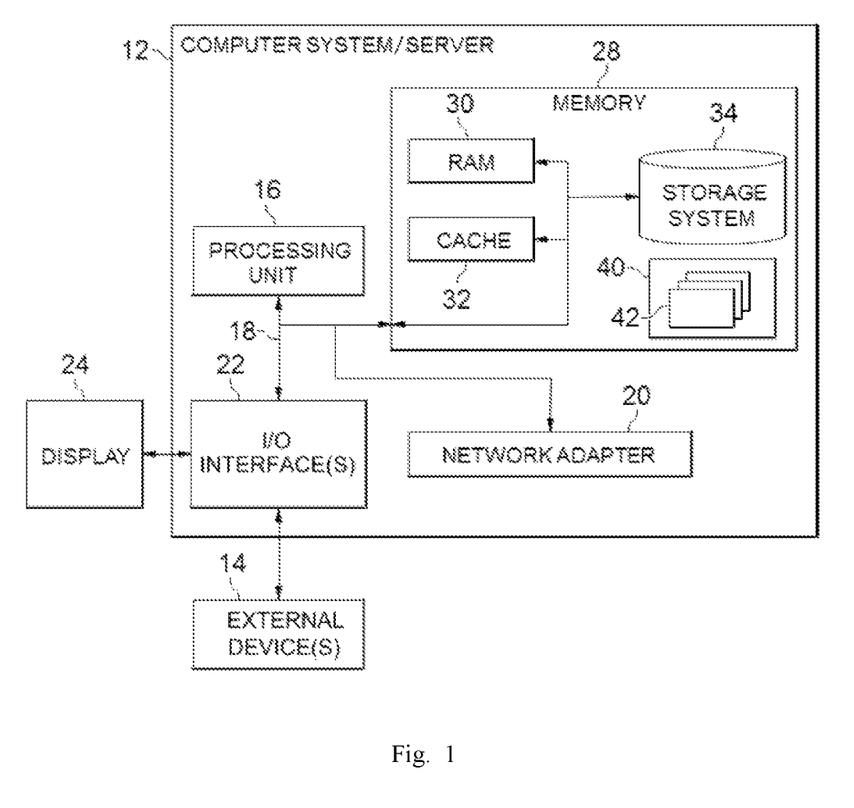
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which can also be adapted to depict an illustrative example of a portable electronic device such as a communication device being applicable to implement the embodiments of the present invention, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
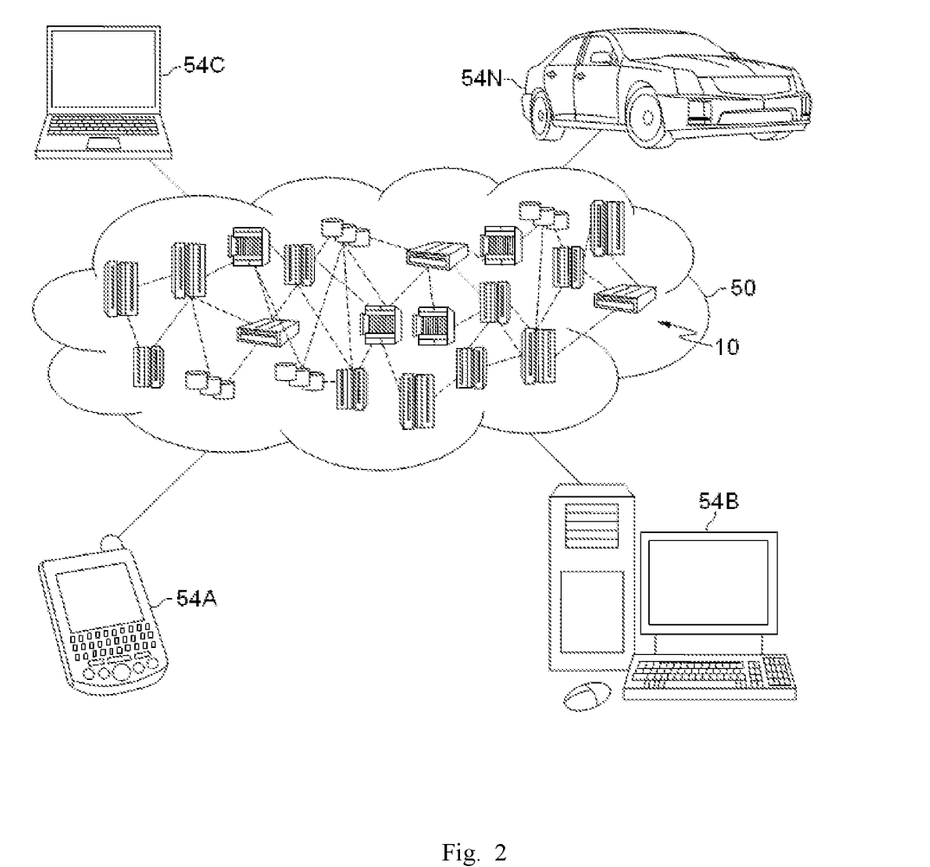
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
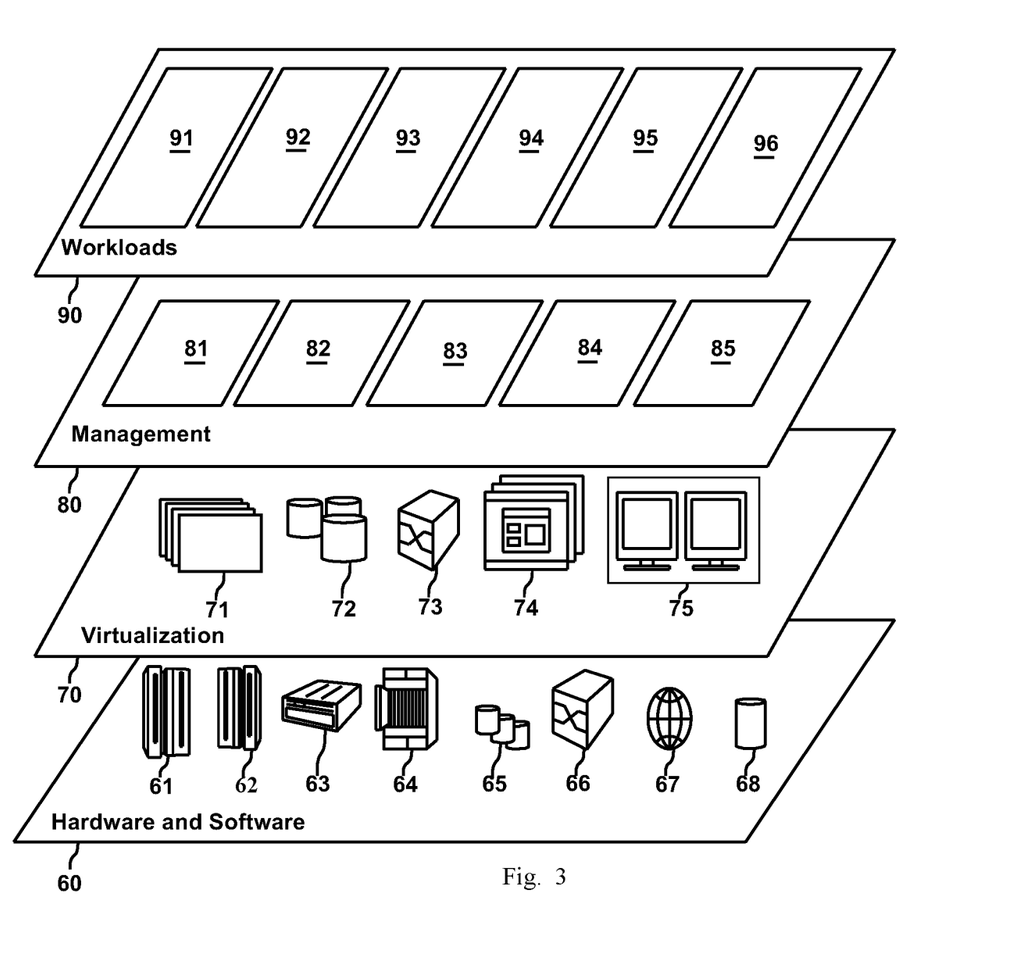
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model training 96.

The disclosure is directed to a computer system and a computer-implemented method for training a deep neural network based model for extracting features using multi-task learning. The feature extracted by the trained deep neural network based model can be used for clustering/classifying accurately.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Embodiments of the present invention will be discussed in details in the below with references to the FIG. 4 which depicts a flowchart illustrating a method for training a neural network for extracting features according to an embodiment of the present invention.

In step 410, training data may be obtained by a deep neural network (DNN).

In one embodiment, the training data may be from any kinds of raw data, including but not limited to trip data, image data, voice data, and text data etc. To obtain the training data used by the deep neural network, the raw data need to be pre-processed, and outputted into the DNN in a required format, for example a multi-dimensional array, in other words, the training data is the pre-processed raw data. It is noted that, it would be clear to a person skilled in the art that various existing pre-processing methods may be employed to process raw data and will not be discussed in details for the purpose of simplification. In the following, embodiments of the present invention will be discussed with trip as the raw data and the training data, typically, trip data include multiple trips with each of the trip comprising at least one segment. It would be clear to a person skilled in the art that all other types of data could be used.

It is well-known that DNNs is neural networks having multiple hidden layers. Within a DNN, each hidden layer determines a non-linear transformation of a previous layer. The training of a DNN may be considered as a non-convex problem which can be illustrated as a graph, a non-convex function (e.g., the loss of the neural network is treated as a function of its weights) that can have many local minima. In one embodiment, convolutional neural network (CNN) or recurrent neural network (RNN) or other types of neural network based DNN architectures may be used to extract features from inputted training data. A DNN based neural network may apply multi-task learning to form a trained DNN based neural model during the procedure of FIG. 4.

In step 420, features of the training data may be obtained from a specified hidden layer of at least one hidden layer of the DNN. According to an embodiment of the present invention, the specified hidden layer is connected respectively to a supervised classification network for classification tasks and an autoencoder based reconstruction network for reconstruction tasks. In the following, the afore-mentioned structure will be described with references to FIG. 5.

Figure 5:
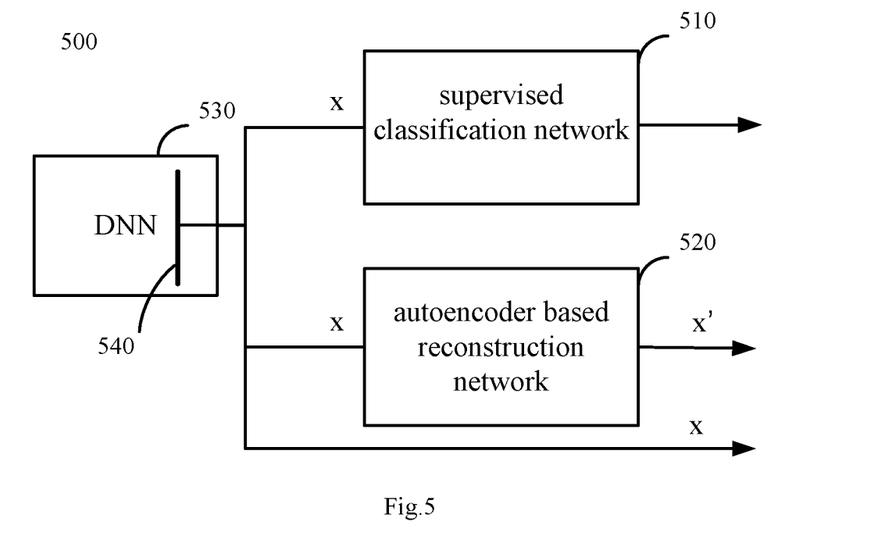
FIG. 5 is a structure diagram of a multi-task learning system according to an embodiment of the present invention.

As mentioned above, the specific hidden layer is connected respectively to a supervised classification network and a reconstruction network, which together constructs a multi-task learning system 500 illustrated in FIG. 5 according to an embodiment of the present invention. As shown in FIG. 5, the specified hidden layer 540 in the DNN 530 may be connected respectively to two different neural networks for different learning tasks using weighted connections between neurons. The two different neural networks could be a supervised classification network 510 for classification tasks, and an autoencoder based reconstruction network 520 for reconstruction tasks, according to an embodiment of the present invention. Since both the supervised classification network 510 and the autoencoder based reconstruction network 520 are connected with the specified hidden layer 540, they can interact with each other via the specified hidden layer 540 which may function as a shared hidden layer. During the training of the multi-task learning system 500, both the supervised classification network 510 and reconstruction network 520 may need to capture runtime output "x" of the specified hidden layer 540 in the deep neural network 530.

In one embodiment, the specified hidden layer 540 of the DNN 530 may be used as a feature extract interface for outputting features obtained from training data, which will also be captured by both the classification network and the reconstruction network. It should be noted that, for a DNN, each of the hidden layer may be used as an interface to output obtained features, usually, the features outputted by a higher hidden layer may be more abstract than a feature outputted by a lower hidden layer. In one embodiment, the last hidden layer may be selected as the specified hidden layer connecting both the classification network and the reconstruction network for their respective learning tasks. In the following, the embodiments of the present invention will be discussed with the last hidden layer as the specific hidden layer for the purpose of illustration, however it should be clear to a person skilled in the art that the last hidden layer is only an example, any other hidden layers may be used as the specified hidden layer.

According to an embodiment of the present invention, the supervised classification network could be a SoftMax based classifier. SoftMax is a well-known generalization of logistic function that maps a K-dimensional vector z of arbitrary real values to a K-dimensional vector $\sigma(z)$ of real values in the range (0, 1) that adds up to 1. Usually, SoftMax function may be used as the activation function in the output layer of the classification task to ensure that the outputs classification are probabilities. In the following, embodiments of the present invention will be discussed with SoftMax based classifier as the supervised classification network, however it should be clear to a person skilled in the art any other existing supervised classification network could be utilized.

In some embodiments, as known by those skilled in the art, the autoencoder based reconstruction network 520 is an artificial neural network used for unsupervised learning of efficient coding. The purpose of reconstruction network 520 is to learn a representation (encoding) for a set of data, typically for dimensionality reduction. And thus, a feature extracting layer with a lower dimension than the shared hidden layer may be obtained by reconstructing the shared layer output instead of the entire network input as the existing autoencoder usually does. In a more detailed embodiment, the reconstruction task reconstructs the shared hidden layer's dynamic output in runtime, and thus, the reconstruction loss of which should be determined based on a dynamic target x outputted by the shared hidden layer.

Figure 6:
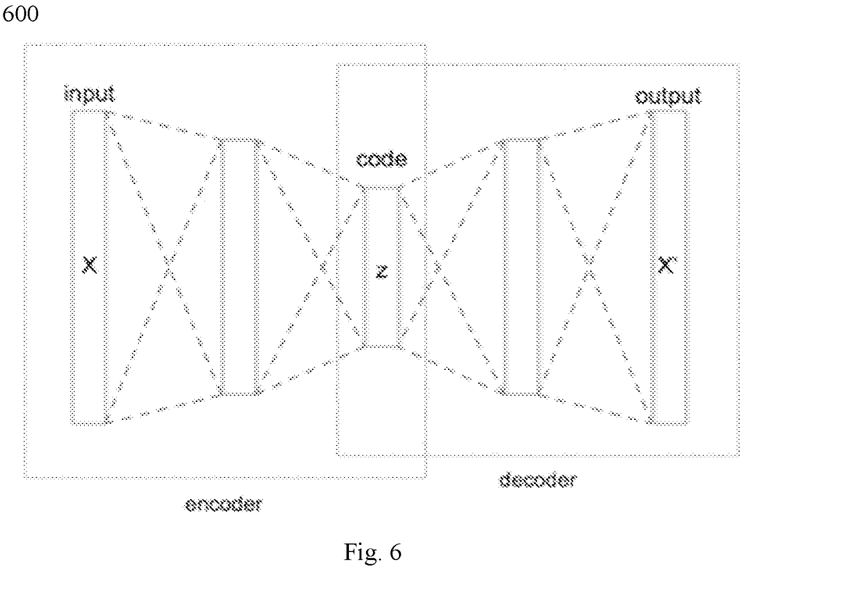
FIG. 6 is an example architecture of an existing autoencoder network according to an embodiment of the present invention.

FIG. 6 is an example architecture of an existing autoencoder network 600 according to an embodiment of the present invention. Architecturally, as shown in FIG. 6, a typical autoencoder is a feedforward, non-recurrent neural network—having an input layer (denoted by x), an output layer (denoted by x') and one or more fully-connected hidden layers (the example autoencoder shown by FIG. 6 has 3 fully-connected hidden layers, one of which denoted by z)—but with the output layer having the same number of nodes as the input layer, and with the purpose of reconstructing its own inputs, therefore, autoencoders are unsupervised learning models. That is, the feature layer (denoted by z) reconstructs the input of the network 600 (denoted by x), and then, z may be taken as compression representation of input x.

Turning back to FIG. 4, in step 430, the deep neural network, the supervised classification network and the reconstruction network may be trained as a whole based on the obtained features, that is, the training of entire neural network may be guided by the classification tasks in the supervised classification network 510 and the reconstruction tasks in the autoencoder based reconstruction network 520. In one embodiment, by using Back Propagation(BP) algorithm, errors or losses may be accepted and back propagated from both tasks, the weights of the entire neural network may be adjusted during the multi-task learning, details of how the neural network being adjusted as a whole during the multi-task learning will be described with reference to FIG. 7 later.

In order to fully understand the training, the concepts of the classification loss of the classification network and the reconstruction loss of the reconstruction network may be described in the following paragraphs firstly.

In one embodiment, the classification loss may be defined according to labels of the training data. Take the trip data as an example, a driver classification loss may be defined by the labels of given trip segments (i.e., driver ID) as supervisory information to guide the classification task.

In the embodiment of taking pre-processed trip data as training data, and SoftMax based classifier as the supervised classification network, the classification loss may be defined by cross entropy based on SoftMax regression output and given supervisory info, for example, the training segments' labels (i.e., driver ID). The SoftMax classifier is hence to minimize the cross-entropy between the estimated classification probabilities and the actual classification probabilities during training.

In one embodiment of taking pre-processed trip data as training data, the reconstruction loss contains an error term, the error term is determined based on the features output from the specified hidden layer.

Following the above embodiment, in a further embodiment, the reconstruction loss of the autoencoder based reconstruction network may be defined by formula 1 as below, and thus, a driving style feature layer may be used to extract low dimensional and sparse features, for example.

$$\text{minimize } \Sigma_i \|x'_i - x_i\|_2^2 + \lambda \|s_i\|_1 \qquad \text{Formula 1:}$$

Formula 1 is an example of the reconstruction loss function of the reconstruction task, the loss function quantifies the amount by which the prediction deviates from the actual values. As can be seen from the formula 1, the loss function contains two terms, with one term corresponding to the error term $\|x'_i - x_i\|_2^2$, another term corresponding to the norm term $\lambda \|s_i\|_1$ used for regularization.

Data represented by $x_i$ is input from the specified hidden layer of DNN, $x'_i$ is output of the autoencoder based reconstruction network, and $s_i$ is corresponding to the code layer "z" of the existing autoencoder architecture shown in FIG. 6, the feature space of s has a lower dimensionality than the input x, then the feature vector s may be regarded as a compressed representation of the input x.

In the embodiment of the formula 1 shown above, L2 norm, for example, $\|x'_i - x_i\|_2^2$ has been applied to the reconstruction loss of the autoencoder as the error term. The L2 norm is known as least squares that minimize the sum of the square of the differences between the target value $x_i$ and the estimated values $x'_i$. By using L2 norm, overfitting may be avoided to some extent.

In an alternative embodiment, L1-norm loss function may be taken as the error term of the loss function. L1-norm loss function is known as least absolute deviations (LAD) or least absolute errors (LAE) that basically minimize the sum of the absolute differences between the target value $x_i$ and the estimated values $x'_i$. It is noted that, other kinds of error function may be used.

In the embodiment of formula 1, a norm regularization term may be used to make output of the feature output interface sparse. Besides making the output sparse, regularization is also a very important technique in machine learning to prevent overfitting, that is, mathematically speaking, a regularization term may be added to prevent the coefficients to fit so perfectly to overfit.

In one embodiment of the regularization term, the loss function may be added with a L1 norm regularization term, which is also known as Lasso regularization. L1 norm may be used to make features sparse, that is, in one exemplary embodiment, L1 norm may be added as a regularization term to the loss function of the autoencoder based reconstruction task. It is noted that, both L1 norm and L0 norm may be used to make the features sparse, comparatively, L1 norm has been widely used because it has a better characteristic of facilitate optimization solution than L0 norm. With reference to the example of formula 1, $\lambda \|s_i\|_1$ is the specific regularization implementation of applying L1 norm to the reconstruction loss of the reconstruction task of present invention, by using the specific L1 norm regularization, s can become a sparse compact representation of x, and can be used for better clustering in the future.

While, in another alternative embodiment of the regularization term, L2 regularization term may also be applied to the loss function.

Figure 7:
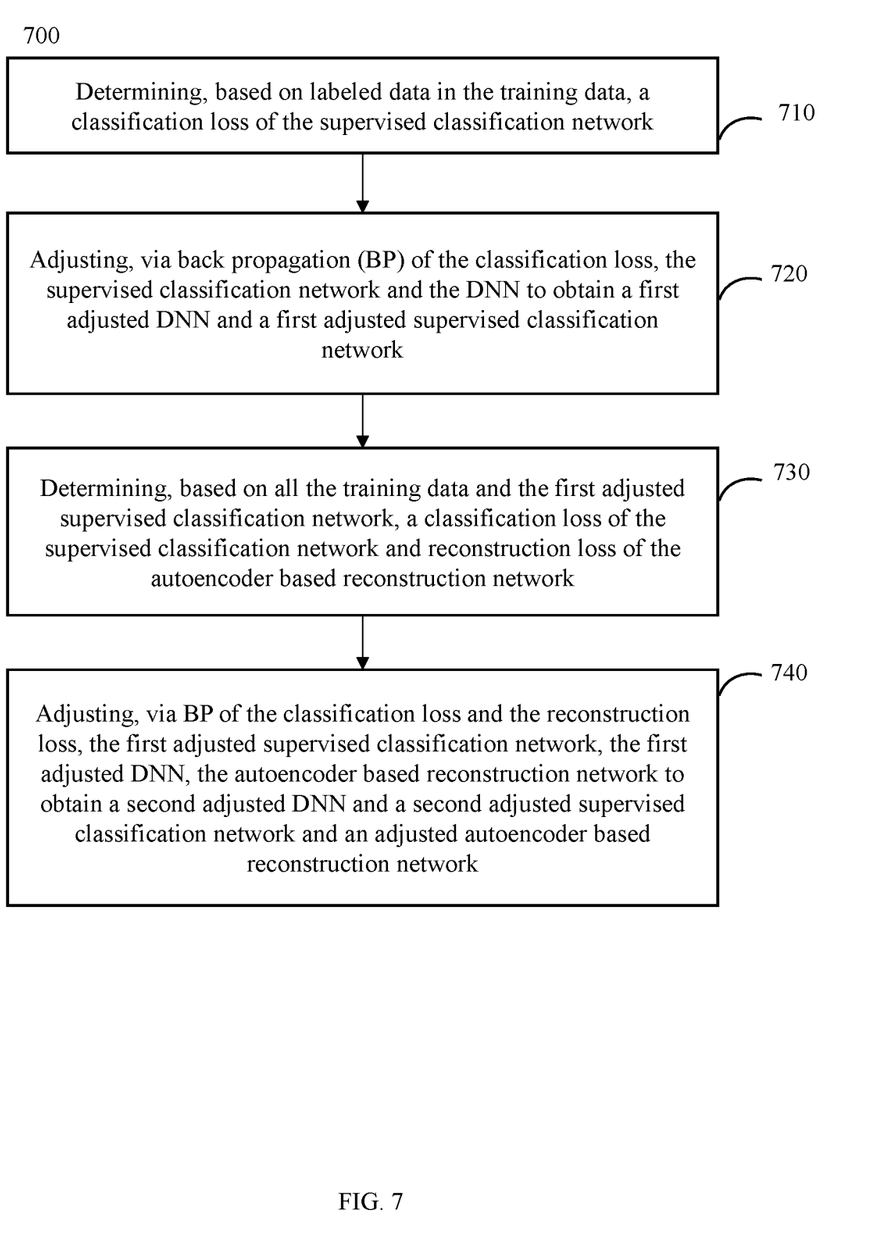
FIG. 7 is a flowchart illustrating a method 700 for adjusting the entire neural network as a whole according to an embodiment of the present invention

FIG. 7 is a flowchart illustrating a method 700 for adjusting the entire neural network as a whole according to an embodiment of the present invention.

In step 710, a classification loss of the classification network may be determined based on labeled data in the training data. In one embodiment, the training data comprises labeled data and unlabeled data, labeled data refer to the data that has been tagged with meaningful information, such as category information.

In step 720, the supervised classification network and the DNN may be adjusted, via back propagation (BP) of the classification loss, to obtain a first adjusted DNN and a first adjusted classification network. And thus, the weights of the supervised classification network and the deep learning network may be initialized and adjusted based on the labeled training data. It serves as an information source for the learning of another task, that is the reconstruction task, which may be launched based on the information provided by the supervised classification task.

In step 730, a classification loss of the classification network and reconstruction loss of the reconstruction network may be determined based on all the training data and the first adjusted classification network. Since the details of how to determine the classification loss and the reconstruction loss have already been described in above, for the concise of the specification, no need to reiterate it. It is noted that, except the way disclosed above, other ways to determine the classification loss and the reconstruction loss may be adopted by a person skilled in the art.

In one embodiment, the labeled data in the training data may be obtained by the supervised classification network again, and classification loss may be determined again based on the adjusted supervised classification network. While, the unlabeled data in the training data may be obtained by the autoencoder based reconstruction network and reconstruction loss may be determined.

In step 740, the first adjusted classification network, the first adjusted DNN, the autoencoder based reconstruction network may be adjusted, via BP of the classification loss and the reconstruction loss, to obtain a second adjusted DNN and a second adjusted supervised classification network and an adjusted autoencoder based reconstruction network. And then, the weights of the entire neural network may be adjusted based on all kinds of training data including both labeled training data and unlabeled training data. In one embodiment, the weights may be adjusted sequentially. In another embodiment, the weights may be adjusted simultaneously, that is to say, each weight may be adjusted based on sum of adjusting value from BP of different tasks.

Now refer back to FIG. 5, the dynamic output x of the specified hidden layer 540 of DNN 530 may be captured during training, and thus, the captured dynamic output x may be used for computing the reconstruction loss. For each input x, activations at all hidden layers of reconstruction task in the autoencoder based reconstruction network 520 may be computed, then output x' may be obtained at the output layer, which can be the last layer of the reconstruction network 520, as shown in FIG. 5. The reconstruction loss may be determined based on the deviation of output x' from the input x. The determined reconstruction loss may be back propagated through the entire neural network shown in FIG. 5 and the entire neural network weights update may be performed between batches. Since the neural network may be adjusted as a whole, the reconstruction target, i.e., the shared specified hidden layer 540 output x changes as the neural network's weights change during adjusting, that is, even with same network input, the reconstruction target x' may be changed. Therefore, the reconstruction loss should be computed based on a dynamic target x output by the specified hidden layer 540 of DNN 530. In one embodiment, the specified hidden layer may be the last hidden layer of DNN 530.

In one further embodiment, the training may be done batch by batch, and the size of each batch may be determined based on experiences. Within a batch, the network weights may be fixed, but the weights updates occur between batches, and the shared hidden layer output x may be updated with latest net weights in next batch.

In conclusion, such a reconstruction task guarantees the features learnt have better generalization performance on unseen data than those features learnt from a single supervised classification network or a single autoencoder based reconstruction network.

In one embodiment, the method 400 may be iterated predetermined times, which may be decided according to experience of a technical person in the arts. After the neural network has been iteratively trained by the predetermined times, a method 800 shown by FIG. 8 may be used to test whether the trained neural network is qualified, e.g. whether the training is completed. If the training is completed, the output of the feature output interface may be the extracted features. In one embodiment, refer back to FIG. 6, the feature output interface is selected from the group consisted of the following: one of the hidden layer(s) of the DNN 530, the intermediated hidden layer of the reconstruction network 520.

Figure 8:
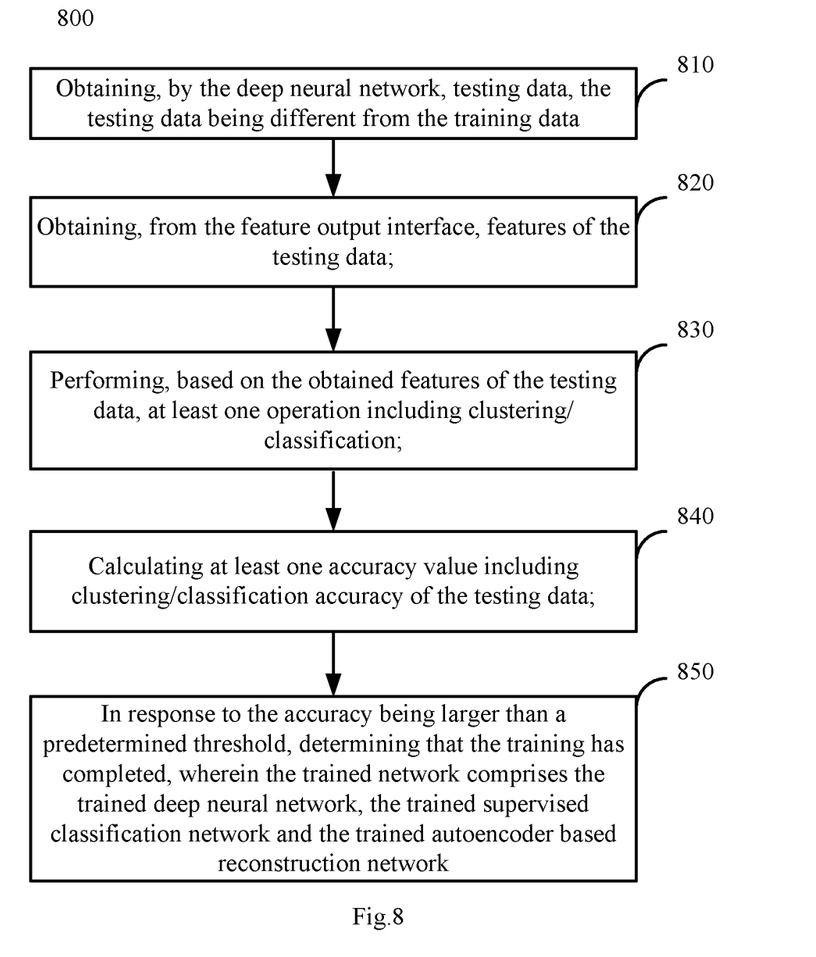
FIG. 8 is a flowchart illustrating a method 800 for testing a trained neural network to decide whether the training is complete according to an embodiment of the present invention.

FIG. 8 is a flowchart illustrating a method 800 for testing a neural network for extracting features according to an embodiment of the present invention. In step 810, testing data may be obtained by the DNN, the testing data being different from the training data. In step 820, features of the testing data may be obtained from a feature output interface. In step 830, at least one operation including clustering/classification may be performed based on the obtained features of the testing data. The clustering/classification may be implemented by a regular clustering/classification method, and thus, a learnt clustering /classification result may be obtained.

In step 840, at least one accuracy value including clustering accuracy/classification accuracy of the testing data may be calculated. Usually, the accuracy value may be determined based on the actual classification and the classification result learnt. Similarly, the clustering accuracy may be evaluated based on the actual cluster label information and the estimated clustering result. How to calculate a specific value based on the actual label and the estimated result may be obvious to a person in the art, details of which may be omitted for sake of concise of the specification.

In step 850, it may be determined that the training is completed in response to at least one of the clustering/classification accuracy value being larger than a predetermined threshold. Here the trained network comprises the trained deep neural network, the trained supervised classification network and the trained autoencoder based reconstruction network and the output of the trained network is the output of the feature output interface.

To train a qualified feature extractor, a predetermined threshold of the clustering accuracy or the classification accuracy may be defined to check whether the training of neural network has completed.

In the implementation of trip data, the training data may include trip data, each trip including at least one segment, and the method may include obtaining, by the DNN, at least one of the segments as the training data.

Figure 9:
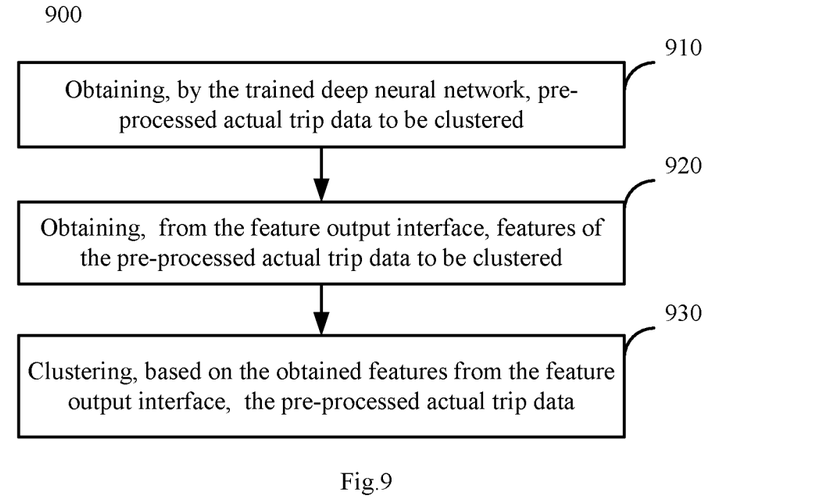
FIG. 9 depicts a flowchart illustrating a method 900 for clustering by using the trained neural network according to an embodiment of the present invention.

FIG. 9 depicts a flowchart illustrating a method 900 for clustering by using the trained neural network according to an embodiment of the present invention.

Refer to FIG. 9, in step 910, actual trip data to be clustered may be pre-processed to be the format required by the trained deep neural network, the pre-processed actual trip data to be clustered may be different with the training trip data. In one embodiment, if the training trip data include multiple training trips, the testing trip data may include multiple testing trips, then the trained DNN may be used to extract features from the pre-processed actual trip data, and thus, the pre-processed actual trip data to be clustered may be clustered based on the extracted features of the pre-processed actual trip data.

Figure 4:
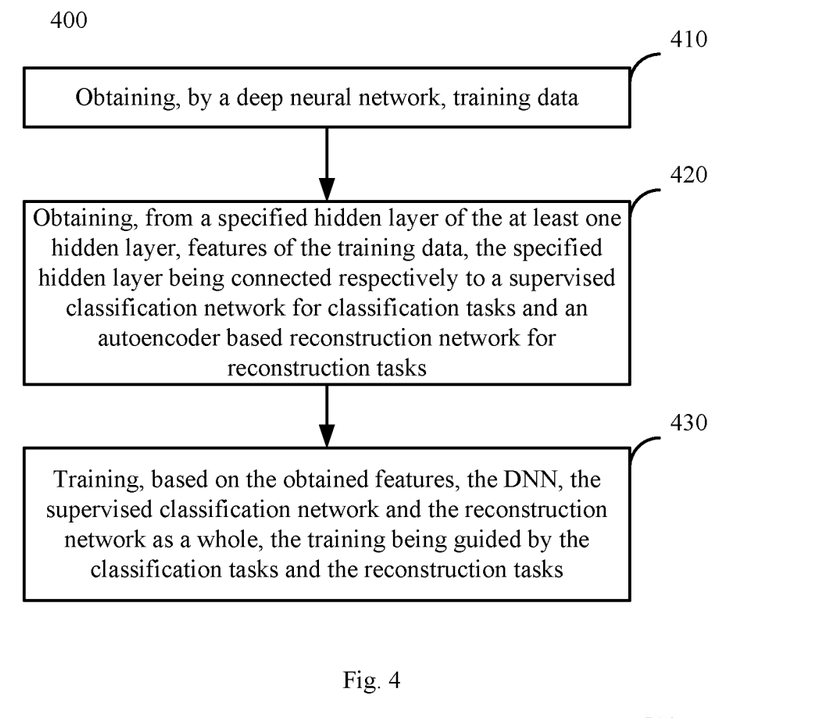
FIG. 4 is a flowchart illustrating a method for training a neural network model for extracting features according to an embodiment of the present invention.

Step 910 is similar with step 410 in FIG. 4, so here the detailed description is omitted for this step 910.

In step 920, features of the pre-processed actual trip data to be clustered may be obtained from the feature output interface.

In one embodiment, once the entire neural network has been trained according to the method 400 described above, the feature output interface may be determined, which is selected from the group consisted of the following: one of the hidden layer(s) of the deep neural network, or the intermediated hidden layer of the reconstruction network.

In one embodiment, one of the hidden layer(s) of the trained deep neural network, for example the last hidden layer, may be taken as the feature output interface, compared with traditional single task trained network, the feature extracted may have a better classification/clustering performance. However, the feature output interface selected from hidden layer(s) of the deep neural network, for example the specified shared layer, may not be a good representation compared with another embodiment below, because the specified shared layer directly connects to supervisory information, the features do not generalize well for trips of unseen drivers.

In another embodiment, the code layer, that is the middle-hidden layer s of the autoencoder based reconstruction network, may be taken as the output interface for extracting driving style feature. As described above, by bridging different types of learning tasks together, a low dimensional & sparse driving style feature representation may be learnt, compared with the feature outputted by the specified hidden layer of DNN, the features learnt may have a better classification or clustering performance, especially for the clustering of unseen drivers.

In step 930, the actual trip data are clustered by any clustering network based on the obtained features from the feature output interface.

In the embodiment of the data to be clustered comprising multiple trips to be clustered, at least one trip may be encoded to a fixed-length feature vector based on the extracted driving style features.

In one embodiment, topic modeling/Bag-of-Words (BOW) strategy may be used to encode trips. The Topic modeling/Bag-of-Words (BOW) is a simplifying representation used in natural language processing and information retrieval (IR). If the topic modeling/Bag-of-Words modeling is applied to the present invention, then each trip may be treated as an article and each segment of the trip may be treated as a paragraph. To be specific, firstly, the learnt feature may be used to encode segments of a trip, that is, by using topic modeling/Bag-of-Words (BOW) strategy, topic of each segment may be obtained to encode the segment. And then, all the encoded segments of a trip may be summed over and normalization may be applied further, and a fixed-length feature vector may be produced to encode the trip, and finally, the fixed-length feature vector may be regarded as topic of each trip.

In one embodiment, using the encoded trip, a driver clustering may be performed, that is, given a set of unlabeled trips, how many drivers generate these trips can be determined. The trip clustering may be performed in the trip feature space, that is, each trip may be regarded as a point in the feature space. In one embodiment, the trips may be clustered by using Affinity Propagation, K-means, or other clustering algorithms, and therefore, number of drivers may be inferred from the number of clusters. In a specific scenario, the clustering result of trips of one car may also be used to infer how many drivers share the car, which can provide important information for insurance companies to make car insurance pricing.

In another embodiment of using the trip features, a driver identification method is provided, that is, given historical trips of one or more known drivers, if a new trip is driven by one of these known drivers or not can be determined. To be specific, at least one trip of known drivers may be encoded by using the trip feature, and further, similarity based algorithm (e.g. nearest neighbor) may be used to determine label of input trips by performing similarity computation between a new trip and the trips of known drivers in the feature space.

Though details of the implementation of the embodiment of method 900 has be described with reference to a trip data scenario, the principle is also applicable to other kinds of scenario, for example image data, text data, voice data, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In addition, while preferred embodiments of the present invention have been described using specific terms, such description is for illustrative purposes only, and it is to be understood that changes and variations may be made without departing from the spirit or scope of the following claims.

What is claimed is:

1. A method, comprising:
   obtaining, by a deep neural network (DNN), training data, the deep neural network comprising at least one hidden layer;
   obtaining, from a specified hidden layer of the at least one hidden layer, features of the training data, the specified hidden layer being connected respectively to a supervised classification network for classification tasks and an autoencoder based reconstruction network for reconstruction tasks;
   training, based on the obtained features, the DNN, the supervised classification network and the reconstruction network as a whole, the training being guided by the classification tasks and the reconstruction tasks;

determining, based on labeled data in the training data, a classification loss of the supervised classification network;

adjusting, via back propagation (BP) of the classification loss, the supervised classification network and the DNN to obtain a first adjusted DNN and a first adjusted supervised classification network;

determining, based on all the training data and the first adjusted supervised classification network, a classification loss of the supervised classification network and reconstruction loss of the autoencoder based reconstruction network; and adjusting, via BP of the classification loss and the reconstruction loss, the first adjusted supervised classification network, the first adjusted DNN, the autoencoder based reconstruction network to obtain a second adjusted DNN and a second adjusted supervised classification network and an adjusted autoencoder based reconstruction network.

2. The method of claim 1, further comprising:
determining a feature output interface, which is selected from the group consisted of the following: one of the hidden layer(s) of the deep neural network, or an intermediated hidden layer of the reconstruction network.

3. The method of claim 2, further comprising:
obtaining, by the deep neural network, testing data, the testing data being different from the training data;
obtaining, from the feature output interface, features of the testing data;
performing, based on the obtained features of the testing data, at least one operation including at least one of clustering and classification;
calculating at least one accuracy value including at least one of clustering accuracy and classification accuracy of the testing data; and
in response to the accuracy being larger than a predetermined threshold, determining that the training is complete, wherein a trained network comprises the trained deep neural network, the trained supervised classification network and the trained autoencoder based reconstruction network and an output of the trained network is the output of the feature output interface.

4. The method of claim 3, wherein the training data include trip data, each trip comprising at least one segment, the method further comprising:
obtaining, by the DNN, at least one of the segments as the training data.

5. The method of claim 4, wherein the testing data comprises trip data, each trip comprising at least one segment, the method further comprising:
obtaining, by the DNN, at least one of the segments as the testing data.

6. The method of claim 1, wherein the classification loss is defined according to labels of the training data, and the reconstruction loss contains an error term determined based on the features outputted from the specified hidden layer.

7. The method of claim 6, wherein, the reconstruction loss further comprises a regularization term, the regularization term is determined based on L1 norm.

8. A computer system, comprising:
a processor;
a computer-readable memory coupled to the processor, the memory comprising instructions that when executed by the processor perform actions of:

obtaining, by a deep neural network (DNN), training data, the deep neural network comprising at least one hidden layer;

obtaining, from a specified hidden layer of the at least one hidden layer, features of the training data, the specified hidden layer being connected respectively to a supervised classification network for classification tasks and an autoencoder based reconstruction network for reconstruction tasks;

training, based on the obtained features, the DNN, the supervised classification network and the reconstruction network as a whole, the training being guided by the classification tasks and the reconstruction tasks;

determining, based on labeled data in the training data, a classification loss of the supervised classification network;

adjusting, via back propagation (BP) of the classification loss, the supervised classification network and the DNN to obtain a first adjusted DNN and a first adjusted supervised classification network;

determining, based on all the training data and the first adjusted supervised classification network, a classification loss of the supervised classification network and reconstruction loss of the autoencoder based reconstruction network; and adjusting, via BP of the classification loss and the reconstruction loss, the first adjusted supervised classification network, the first adjusted DNN, the autoencoder based reconstruction network to obtain a second adjusted DNN and a second adjusted supervised classification network and an adjusted autoencoder based reconstruction network.

9. The system of claim 8, the processor also performing actions of:
determining a feature output interface, which is selected from the group consisted of the following: one of the hidden layer(s) of the deep neural network, or an intermediated hidden layer of the reconstruction network.

10. The system of claim 9, the processor also performing actions of:
obtaining, by the deep neural network, testing data, the testing data being different from the training data;
obtaining, from the feature output interface, features of the testing data;
performing, based on the obtained features of the testing data, at least one operation including at least one of clustering and classification;
calculating at least one accuracy value including at least one of clustering accuracy and classification accuracy of the testing data; and
in response to the accuracy being larger than a predetermined threshold, determining that the training is complete, wherein a trained network comprises the trained deep neural network, the trained supervised classification network and the trained autoencoder based reconstruction network and an output of the trained network is the output of the feature output interface.

11. The system of claim 10, wherein the training data include trip data, each trip comprising at least one segment, the method further comprising:
obtaining, by the DNN, at least one of the segments as the training data.

12. The system of claim 11, wherein the testing data comprises trip data, each trip comprising at least one segment, the method further comprising:

obtaining, by the DNN, at least one of the segments as the testing data.

13. The system of claim 8, wherein the classification loss is defined according to labels of the training data and the reconstruction loss contains an error term determined based on the features outputted from the specified hidden layer.

14. The system of claim 13, wherein, the reconstruction loss further comprises a regularization term, the regularization term is determined based on L1 norm.

15. A computer program product, comprising a computer readable storage medium having program instructions embodied therewith, the program instructions executable by a processor to cause the processor to:
- obtain, by a deep neural network (DNN), training data, the deep neural network comprising at least one hidden layer;
- obtain, from a specified hidden layer of the at least one hidden layer, features of the training data, the specified hidden layer being connected respectively to a supervised classification network for classification tasks and an autoencoder based reconstruction network for reconstruction tasks; and
- train, based on the obtained features, the DNN, the supervised classification network and the reconstruction network as a whole, the training being guided by the classification tasks and the reconstruction tasks;
- determining, based on labeled data in the training data, a classification loss of the supervised classification network;
- adjusting, via back propagation (BP) of the classification loss, the supervised classification network and the DNN to obtain a first adjusted DNN and a first adjusted supervised classification network;
- determining, based on all the training data and the first adjusted supervised classification network, a classification loss of the supervised classification network and reconstruction loss of the autoencoder based reconstruction network; and
- adjusting, via BP of the classification loss and the reconstruction loss, the first adjusted supervised classification network, the first adjusted DNN, the autoencoder based reconstruction network to obtain a second adjusted DNN and a second adjusted supervised classification network and an adjusted autoencoder based reconstruction network.

16. The computer program product of claim 15, the program instructions executable by the processor also cause the processor to:
- determine a feature output interface, which is selected from the group consisted of the following: one of the hidden layer(s) of the deep neural network, or an intermediated hidden layer of the reconstruction network.

17. The computer program product of claim 16, the program instructions executable by the processor also cause the processor to:
- obtain, by the deep neural network, testing data, the testing data being different from the training data;
- obtain, from the feature output interface, features of the testing data;
- perform, based on the obtained features of the testing data, at least one operation including at least one of clustering and classification;
- calculate at least one accuracy value including at least one of clustering accuracy and classification accuracy of the testing data; and
- in response to the accuracy being larger than a predetermined threshold, determining that the training is complete, wherein a trained network comprises the trained deep neural network, the trained classification network and the trained reconstruction network and an output of the trained network is the output of the feature output interface.

18. The computer program product of claim 17, wherein the training data comprises trip data, each trip comprising at least one segment, the method further comprising:
- obtaining, by the DNN, at least one of the segments as the training data.

19. The computer program product of claim 18, wherein the testing data comprises trip data, each trip comprising at least one segment, the method further comprising:
- obtaining, by the DNN, at least one of the segments as the testing data.

20. The computer program product of claim 15, wherein the classification loss is defined according to labels of the training data and the reconstruction loss contains an error term determined based on the features outputted from the specified hidden layer.

21. The computer program product of claim 20, wherein, the reconstruction loss further comprises a regularization term, the regularization term is determined based on L1 norm.

* * * * *